United States Patent [19]

Cassel

[11] Patent Number: 4,741,657
[45] Date of Patent: May 3, 1988

[54] LINE STOCKING CONVEYOR

[75] Inventor: Raymond L. Cassel, North Wales, Pa.

[73] Assignee: Artco Corporation, Hatfield, Pa.

[21] Appl. No.: 935,519

[22] Filed: Nov. 26, 1986

[51] Int. Cl.[4] .............................................. B65G 1/06
[52] U.S. Cl. .................................. 414/267; 198/751; 414/660
[58] Field of Search ............... 414/267, 266, 594, 660, 414/674; 198/580, 774, 955, 751, 468.8

[56] References Cited

U.S. PATENT DOCUMENTS

| | | | |
|---|---|---|---|
| 1,054,900 | 3/1913 | Brunelle | 414/674 |
| 1,525,870 | 2/1925 | Lee | |
| 1,849,385 | 3/1932 | Sekulski | |
| 1,911,984 | 5/1933 | Allen | |
| 2,348,112 | 5/1944 | Da Costa | 198/468.8 |
| 2,861,672 | 11/1958 | Buhrer et al. | 198/580 X |
| 3,291,278 | 12/1966 | Meinas | 198/20 |
| 3,355,008 | 11/1967 | Milazzo | 198/751 |
| 3,583,580 | 6/1971 | Dean | 214/6 |
| 3,677,393 | 7/1972 | Temple | 198/85 |
| 3,690,435 | 9/1972 | King et al. | 198/20 |
| 3,904,022 | 9/1975 | Lutz | 198/580 |
| 3,955,613 | 5/1976 | Lund | 164/130 |
| 4,219,301 | 8/1980 | Freeman | 198/468.8 X |
| 4,236,626 | 12/1980 | Noe | 198/774 X |
| 4,658,951 | 4/1987 | Saunders | 198/751 X |

FOREIGN PATENT DOCUMENTS

| 2742144 | 3/1979 | Fed. Rep. of Germany | 198/468.8 |
|---|---|---|---|
| 110561 | 8/1979 | Japan | 198/580 |

Primary Examiner—Robert J. Spar
Assistant Examiner—Stuart J. Millman
Attorney, Agent, or Firm—Bernard, Rothwell & Brown

[57] ABSTRACT

A line stocking conveyor sequentially moves bins full of parts to an access position at an assembly line. Bins are sequentially moved between stations within a feeding channel by a reciprocating bed of linked conveying tables, each table including raisable pads for lifting and holding bins during movement of the bins between stations. Empty bins are conveyed to a return channel adjacent the feeding channel, and sequentially moved between stations of the return channel to a final removal station in the return channel by a reciprocating bed having raisable bed pads for lifting and carrying a bin during movement of the bed.

11 Claims, 4 Drawing Sheets

LINE STOCKING CONVEYOR

BACKGROUND OF THE INVENTION

1. Field of the Invention

The present invention relates to the field of conveying individual bins from a loading station to a bin-unloading station, and thereafter conveying the bins to a removing station.

2. Description of the Background Art

Automobile assembly lines are stocked with automobile parts contained in parts bins. The parts bins are loaded at the parts source and shipped in the bins to the automobile assembly plant. Typically, the bins are manufactured with runners along their bottom portions.

Previously, parts bins were moved to the assembly line using gravity. The full bins were brought in on an upper transport lane and lowered to a bottom level to the assembly line workers for emptying. Other methods for conveying the bins were later developed. According to one method, bins were gravity fed to the assembly line along a bottom lane rather than a top lane as described above. A major problem with gravity feed of parts bins involves the condition of the runners on the bottom of the bins. Extensive use in shipping and lack of concern as to their condition often results in broken, twisted or occasionally missing rails. Bins having damaged rails do not move smoothly on a gravity conveyor system. Consequently, gravity fed units frequently need to be adjusted to high pitch levels so that damaged bins will proceed. However, excessively high pitch levels accelerate undamaged bins to undesirable speeds.

Non-gravity fed conveyors of automobile parts bins are also known. These conveyors move the bins on rollers using a "pusher-dog." Although eliminating the necessity of using gravity to convey the bins, problems still may occur with damaged runners interfering with the rotation of the rollers on which the bins are conveyed. There remains a need in the art for an apparatus for conveying parts bins which does not possess the disadvantages of the prior art conveyors.

SUMMARY OF THE INVENTION

A line stocking conveyor according to the present invention includes a feeding channel for sequentially conveying parts bins from a bin entry station at one end of the feeding channel to a bin unloading station at the opposite end of the feeding channel. The bins are sequentially moved from station to station in the feeding channel by a reciprocating bed made up of a row of adjacent linked bin-conveying tables. Parts bins are lifted by a table at one station and advanced to an adjacent, downstream station during movement of the reciprocating bed. The bin then is lowered by the table at the downstream station. All of the stations of the feeding channel can thus be sequentially filled with parts bins ready for consecutive unloading at the unloading station. After unloading a bin, the bin is conveyed from the bin unloading station to an initial return station of a return channel located adjacent the feeding channel. Bins are sequentially conveyed to a final bin removal station in the return channel in a direction opposite the direction bins are conveyed in the feeding channel. The bins are conveyed in the return channel by a second reciprocating bed including a row of adjacent linked bin-conveying tables for sequentially and stepwise moving bins along the return channel to the final bin removal station.

DESCRIPTION OF THE PREFERRED EMBODIMENT

Figure 3:
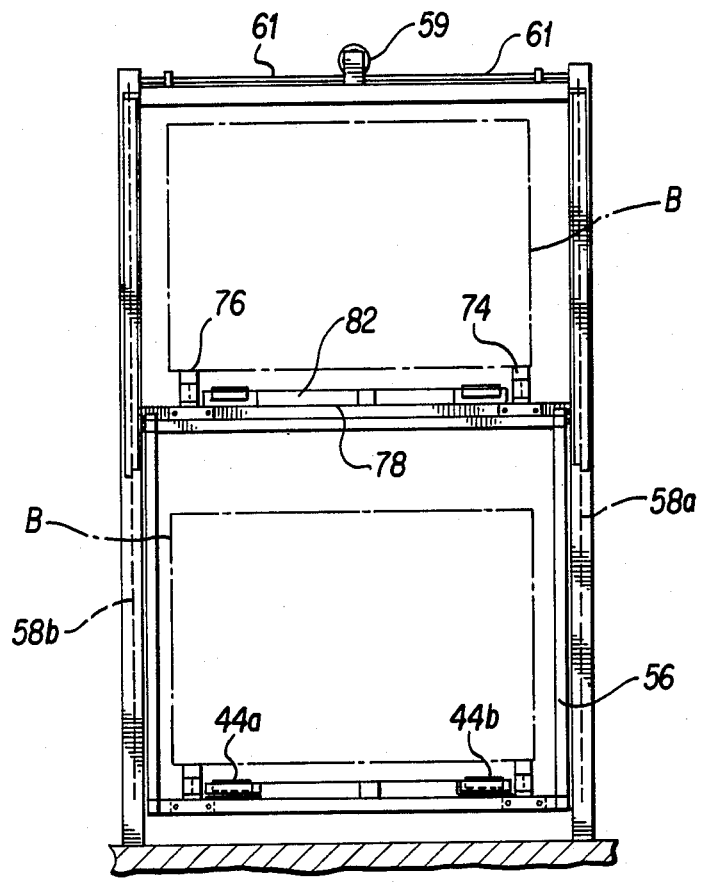
FIG. 3 is a front elevational view, partly schematic, of the line stocking conveyor of FIG. 1.

A line stocking conveyor according to the invention includes a feeding channel 10 for conveying bins B (shown in phantom lines in FIGS. 1 and 3), the bins containing automobile parts or other conveyable materials.

Figure 1:
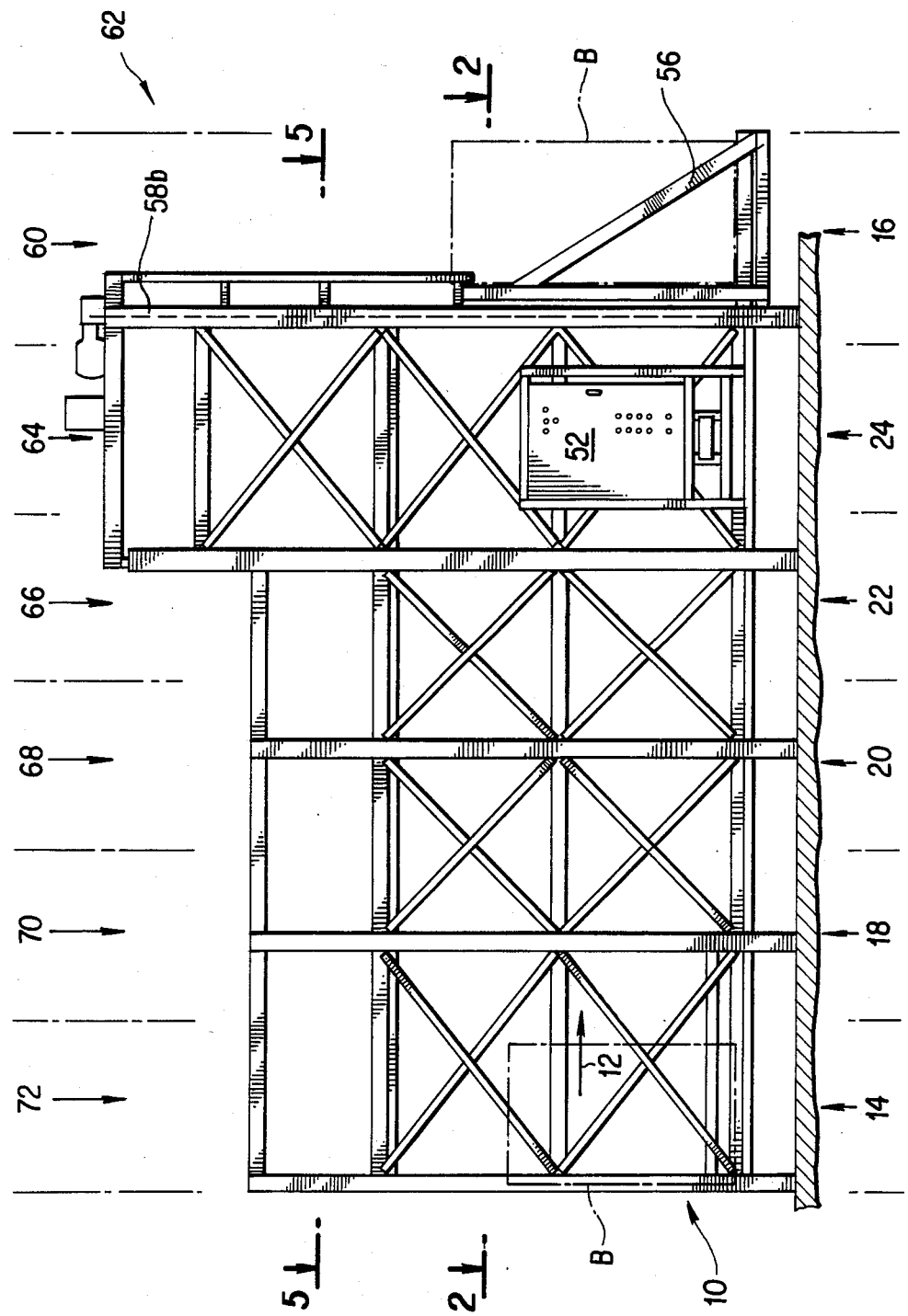
FIG. 1 is a side elevation view, partly schematic, of a line stocking conveyor according to the present invention.
Figure 2:
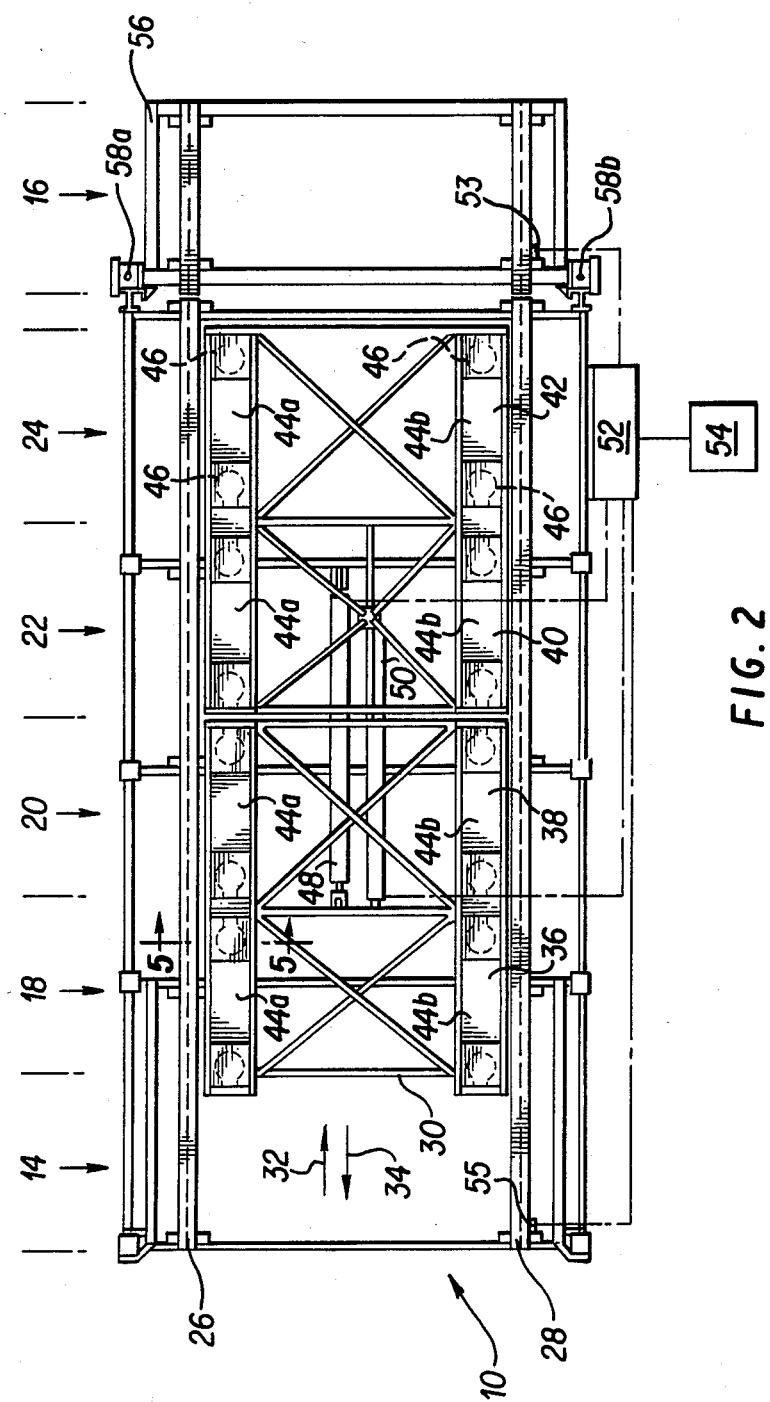
FIG. 2 is a top sectional view, partly schematic, along line 2—2 of FIG. 1.

The feeding channel 10 is divided into a plurality of adjacent bin stations sequentially arranged in a row. FIGS. 1 and 2 divide the feeding channel into six sequentially arranged adjacent bin stations: a bin entry station 14 at one end of feeding channel 10, a bin unloading station 16 at an opposite end of the feeding channel, and four intermediate stations 18, 20, 22 and 24 between entry station 14 and unloading station 16. A pair of rails 26 and 28 extend longitudinally along the bottom of the feeding channel for supporting bins while the bins are stationary.

The conveyor of this invention sequentially moves bins or containers full of parts to an access position at an assembly line. For loading the conveyor, a forklift operator individually places bins full of parts on rails 26 and 28 at entry station 14.

Figure 4:
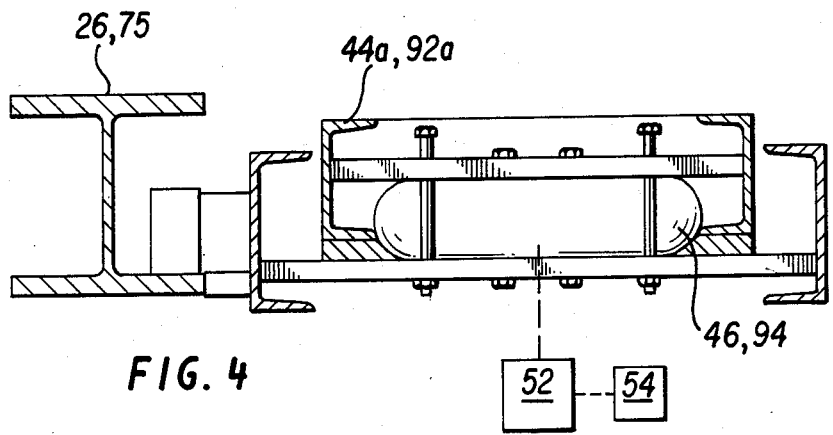
FIG. 4 is an enlarged sectional view, partly schematic, along line 4—4 of FIG. 2.
Figure 5:
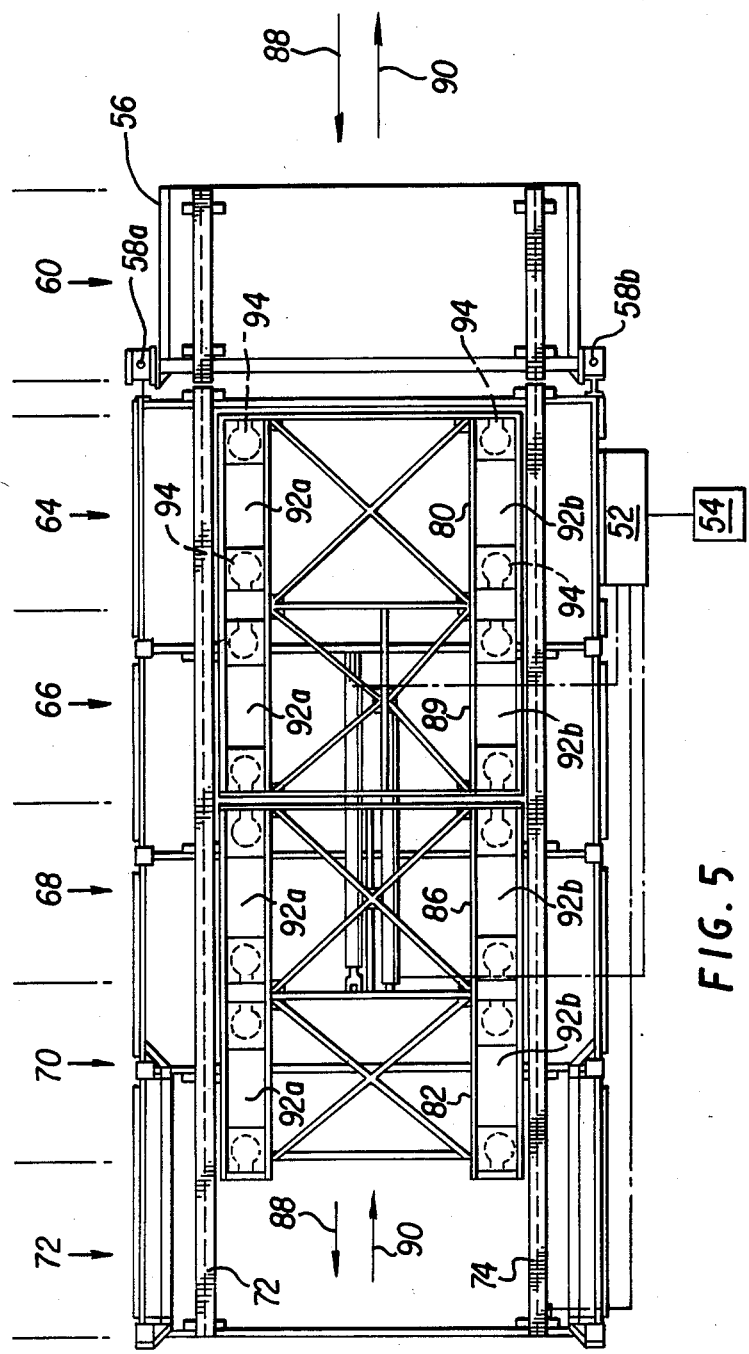
FIG. 5 is a sectional view, partly schematic, along lines 5—5 of FIG. 1.

Bins are moved between stations in the feeding channel in the direction of arrow 12 by a reciprocating bed 30 capable of reciprocating movement in the direction of arrows 32 and 34 to stepwise convey bins station to station between the bin entry station 14 and the bin unloading station 16. Reciprocating bed 30 includes a row of four sequentially linked adjacent bin conveying tables which reciprocate as a group. Reciprocating bed 30 includes an entry end table 36, an unloading end table 42 and intermediate tables 38 and 40 therebetween. Each of tables 36, 38, 40 and 42 is sized for a single bin. On opposite sides of each table are pneumatically raisable bed pads 44a and 44b. See FIGS. 2, 3 and 4. Pads 44a and 44b are raised and lowered by pneumatically actuated air bladder rings 46 at opposite ends of the pads. Air cylinder 48 is provided for reciprocating the linked bin tables of the bed between corresponding adjacent bin stations for sequentially conveying bins between adjacent bin stations towards the unloading station.

During sequential movement of a bin from station to station, the bin is lifted off of the rails 26 and 28 by inflation of doughnut-shaped inflatable bladder rings 46 beneath bed pads 44a and 44b of a corresponding table. With the bin in the raised position, the bed 30 of linked tables is moved in the direction of arrow 32 by operation of air cylinder 48 to convey a bin from one station to the next. The bin then is dropped back down onto rails 26 and 28 at the station to which it has been conveyed by deflation of bladder rings 46 to lower bed pads 44a and 44b. After conveying a bin to an immediately downstream station, the bed 30 of linked tables is moved in the direction of arrow 34 by action of air cylinder 48 to continue the bin conveying cycle.

Automatic sequential advancement of the bins is controlled by control box 52 which sequences raising of pads 44a and 44b with reciprocation of bed 30 to automatically convey bins through feeding channel 10. Bladder rings 46 are inflated and deflated under the control of control box 52 connected to a source of pressurized air 54. See FIG. 4. Sequential operation of air cylinder 48 for reciprocating movement of bed 30 also is under the control of control box 52 connected to air supply 54. See FIG. 2. The bladder rings are completely deflated prior to return movement of the bed after advancing a bin, to avoid unintended inflation of bladder rings due to back pressure during deflation which might raise a bed pad and cause the bed pad to catch on a bin.

As noted above, feeding channel 10 can be loaded with bins by a forklift operator individually loading the bins into entry station 14. Sensor 55 senses the presence or absence of a bin in entry station 14 for advancement of the bin through the feeding channel by bed 30 under the control of control box 52. The bins are automatically conveyed through the feeding channel 10 to fill the conveyor with loaded bins at each of stations 14, 18, 20, 22 and 24 of the feeding channel. After initial loading of the feeding channel, a bin is conveyed under manual control from station 24 to the unloading station 16 for emptying of the bin. Initial advancement of a bin into unloading station 16 from station 24 is accomplished by manually actuating a switch in control box 52. After the first bin in the unloading station is emptied and removed from the unloading station as described below, bins are automatically conveyed for unloading to the unloading station 16 from station 24 under the control of control box 52.

Although the entire bed 30 of linked tables 36, 38, 40 and 42 reciprocates as a group to sequentially convey bins between stations 14, 18, 20, 22 and 24, bed 30 separates into front and rear bed portions for conveying a bin from intermediate station 24 to unloading station 16. Bed 30 separates into front and rear bed portions between tables 38 and 40, with the front bed portion including the unloading end table 42 linked to table 40, and the rear bed portion including entry end table 36 linked to table 38. Air cylinder 50, under the control of control box 52 connected to air supply 54, alternately advances and retracts the front bed portion towards and away from the unloading station 16 while the rear bed portion remains stationary, to convey bins from station 24 to unloading station 16.

When all of the parts are removed from a bin in the unloading station 16 (or the bin in the unloading station 16 is found to have improper or defective parts), an operator manually actuates a switch in control box 52 which activates a lift 56 of the unloading station. See FIGS. 1, 2, 3 and 5. Lift 56 raises the empty bin by operation of vertical screws 58a and 58b on opposite sides of lift 56. Screws 58a and 58b are rotated by motor 59 through linkage 61, under the control of control box 52. Lift 56 conveys the bin upwardly from the bin unloading station 16 of feeding channel 10 to an initial return station 60 of a bin return channel 62. The bin return channel 62 is located adjacent to and directly above feeding channel 10 for conveying empty bins, or bins containing improper or defective parts, in a direction opposite to the direction of travel in feeding channel 10.

The return channel 62 is arrayed in a similar manner as the feeding channel with a plurality of adjacent bin return stations 64, 66, 68 and 70 sequentially arranged in a row between the initial bin return station 60 at one end of the return channel and a final bin removal station 72 at an opposite end of the return channel. See FIGS. 1 and 5. The initial bin return station 60 of the return channel is adjacent the bin unloading station 16 of the feeding channel, and the bin removal station 72 of the return channel is adjacent the entry station 14 of the feeding channel.

The return channel includes a pair of rails 74 and 76 for supporting bins while stationary in the bin stations of return channel 62. See FIGS. 3 and 5. Return channel 62 further includes a reciprocating bed 78, similar to bed 30 in the feeding channel, and capable of reciprocating movement for conveying bins between the initial bin return station 60 and the bin removal station 72. Bed 78 has a row of four sequentially linked adjacent bin conveying tables, including an initial return table 80, a final placement table 82, and intermediate tables 84 and 86 therebetween. Bed 78 is capable of reciprocating movement in the directions of arrows 88 and 90, with each of the tables of the return channel being capable of conveying individual bins in the direction of arrow 88 towards the bin removal station 72.

Each of the upper return tables 80, 82, 84 and 86 includes a pair of bed pads 92a and 92b, one on each side of each table. Each of the bed pads 92a and 92b are raised and lowered by inflatable bladder rings 94 at opposite ends of each bed pad under the control of control box 52 connected to air supply 54. See FIGS. 4 and 5.

Empty bins are conveyed under the control of control box 52 through the return channel 62 in a manner similar to bin movement through the lower feeding channel 10 after lift 56 raises an empty bin to the initial bin return station 60. As with bed 30, the entire bed 78 of linked tables 80, 82, 84 and 86 reciprocates as a group to sequentially convey bins between stations 64, 66, 68, 70 and 72, whereas bed 78 separates into fore and aft bed portions for conveying a bin from the initial return station 60 to intermediate return station 64. Bed 78 separates into fore and aft bed portions between tables 84 and 86, with the fore bed portion including the initial return table 80 linked to table 84 and the aft bed portion including final placement table 82 linked to table 86. Air cylinder 50′, under the control of control box 52 connected to air supply 54, alternately advances and retracts the fore bed portion towards and away from the initial return station 60 while the aft bed portion remains stationary, to convey bins from initial return station 60 to intermediate station 64. For removing a bin from station 60, control box 52 signals the fore portion of bed 78 to automatically move in the direction of arrow 90 to position table 80 beneath the empty bin at station 60, while the aft portion of bed 78 remains stationary. Bed pads 92a and 92b of table 80 then are raised under the control of control box 52 to lift the bin, and the fore portion of bed 78 is returned in the direction of arrow 88 to position the empty bin in station 64. Bed pads 92a and 92b then are lowered, and the empty bin is sequentially and automatically conveyed under the control of control box 52 station-by-station to the bin removal station 72 by sequential raising and lowering of corresponding bed pads 92a and 92b during reciprocal movement of the entire bed 78.

When the empty bin has been positioned in the final bin removal station 72, the empty bin can be immediately removed by a forklift operator. If additional empty bins are conveyed to the return channel by lift 56 with an empty bin present in final bin removal station 72, newly arriving bins will be automatically and sequentially positioned in respective stations 70, 68, 66 and 64 under the control of control box 52. As bins are removed from the final bin removal station 72, sensor 96 senses the absence of a bin in station 72 and signals control box 52 to sequentially and automatically advance an empty bin from station 70 into station 72, from bin 68 into station 70 and on down the line for removal of bins from the return channel After table 80 has retracted an empty bin from station 60 to station 64, control box 52 signals motor 59 to lower lift 56 to the unloading station 16 of feeding channel 10. Sensor 53 senses the presence or absence of a bin in station 24. If a bin full of parts is present in station 24 of the feeding channel, the bin is automatically advanced into the unloading station 16 by bed 30 under the control of control box 52. A bin, if present in station 22, is automatically advanced into station 24 and on down the line for unloading of bins at the unloading station 16.

The return channel need not be above the feeding channel as illustrated and described, but can, for example, be located along side the feeding channel with bins being transferred horizontally instead of vertically.

The present invention provides a line stocking conveyor capable of conveying damaged or undamaged bins to an access position at an assembly line, and returning empty bins, or bins containing improper or defective parts, for bin removal.

Since many modifications, variations and changes in detail may be made to the described embodiment, it is intended that all matter in the foregoing description and shown in the accompanying drawings be interpreted as illustrated and not in a limiting sense.

What is claimed is:

1. A line stocking conveyor comprising:
   (a) a feeding channel for conveying bins in a first direction, the feeding channel including:
      (i) a plurality of adjacent bin stations sequentially arranged in a row, including a bin entry station at one end of the feeding channel and a bin unloading station at an opposite end of the feeding channel, each of stations including bin support means for supporting a bin when not being conveyed;
      (ii) a first bed in the feeding channel capable of reciprocating movement to sequentially advance bins individually placed in the bin entry sation from station to station between the bin entry station and the bin unloading station, the bed including front and rear bed portions each bed portion being comprised of a plurality of linked tables in a row, the front bed portion including an unloading end table, the rear bed portion including an entry end table, the entry end table and the unloading end table being at opposite ends of the first bed, each of the said tables in the feeding channel being capable of conveying one bin at a time in the direction of said bin unloading station, each of said tables including means for selectively independently raising a bin above the bin support means at an upstream bin station prior to movement of the bed in the direction of the unloading station and for lowering the bin onto the bin support means at an adjacent downstream bin station prior to return movement of the bed in the direction of the entry station wherein a bin on one of the tables may be advanced while other bins in the feeding channel remain stationary, means for reciprocating the bed for reciprocal movement of the linked bin tables between corresponding adjacent bin stations for sequentially conveying bins between adjacent bin stations towards the unloading station, means for advancing and retracting the front bed portion towards and away from the unloading station while the rear bed portion is stationary to convey a bin from said front bed portion to said unloading station;
   (b) a return channel adjacent to the feeding channel for conveying bins in a direction opposite to said first direction, the return channel including:
      (i) a plurality of adjacent bin return stations sequentially arranged in a row including an initial return station at one end of the return chanel adjacent the unloading station of the feeding channel and a final removal station at an opposite end of the return channel adjacent the entry station of the feeding channel, each of said return stations including a bin support means for supporting a bin when not being conveyed;
      (ii) a second bed in the return channel capable of reciprocating movement to sequentially advance bins from station to station between the initial return station and the bin removal station, the second bed including fore and aft bed portions each bed portion being comprised of a plurality of linked tables in a row, the fore bed portion including an initial return table, the aft bed portion including a final placement table, the initial return table and the final placement table being at opposite ends of the second bed, each of said tables in the return channel being capable of conveying one bin at a time in the direction of said final bin removal station, each of the return tables including means for selectively independently raising a bin above the bin support means at an upstream bin return station prior to movement of the return bed in the direction of the bin removal station and for lowering the bin onto bin support means at an adjacent downstream bin station prior to return movement of the bed in the direction of the initial bin return station wherein a bin on one of the tables may be advanced while other bins in the return channel remain stationary, means for reciprocating the return bed for retracting a bin from the initial return station and for reciprocal movement of the linked return bin tables between corresponding adjacent bin stations for sequentially conveying bins between adjacent bin stations of the return channel to the removal station, means for advancing and retracting the fore bed portion towards and away from the initial station while the aft bed portion is stationary to convey a bin from said initial return station to an intermediate return station adjacent to and immediately downstream of the initial return station; and (c) means for conveying a bin from the bin unloading station of the feeding channel to the initial return station of the return channel.

2. The conveyor of claim 1 further including means for sensing the presence of a bin in the bin entry station and the presence of a bin in an intermediate station adjacent to and immediately upstream of the bin unloading station, and for sequentially and automatically controlling the bin raising means and the bed reciprocating means to sequentially and automatically convey bins placed in the entry station towards the unloading station; and means for sensing the presence of a bin in the final removal station, and for sequentially and automatically controlling the bin raising means and the bed reciprocating means in the return channel, to sequentially and automatically convey bins placed in the initial bin return station towards the final removal station.

3. The conveyor of claim 1 wherein the bin support means comprises a pair of rails extending longitudinally along the feeding channel and the return channel.

4. The conveyor of claim 1 wherein the bin raising means comprises pneumatically raisable pads for each bin conveying table.

5. The conveyor of claim 4 wherein said pneumatically raisable pads are raised and lowered by pneumatically inflated bladders.

6. The conveyor of claim 1 wherein the return channel is above the feeding channel.

7. The conveyor of claim 1 wherein the means for conveying a bin from the unloading station to the initial return station of the return channel includes rotatable screw means.

8. The conveyor of claim 1 wherein the first and second reciprocating beds are reciprocated by air cylinders.

9. The conveyor of claim 1 wherein the first bed has two fewer tables than there are bin stations in the feeding channel, and the second bed has two fewer tables than there are bin stations in the return channel.

10. The conveyor of claim 6 wherein the means for conveying a bin from the bin unloading station to the initial return station of the return channel is a manually operated lift which automatically returns to the unloading station after retraction of a bin from the initial return station.

11. The conveyor of claim 10 further including means for automatically advancing into said unloading station a bin present in a feeding channel bin station immediately adjacent said unloading station when said lift returns to said unloading station from said initial return station.

* * * * *